July 15, 1958 R. R. GROVER 2,842,985
MULTIPLE INDEXING MACHINE TOOL WITH PROGRAM SYSTEM
Original Filed March 3, 1954 11 Sheets-Sheet 1
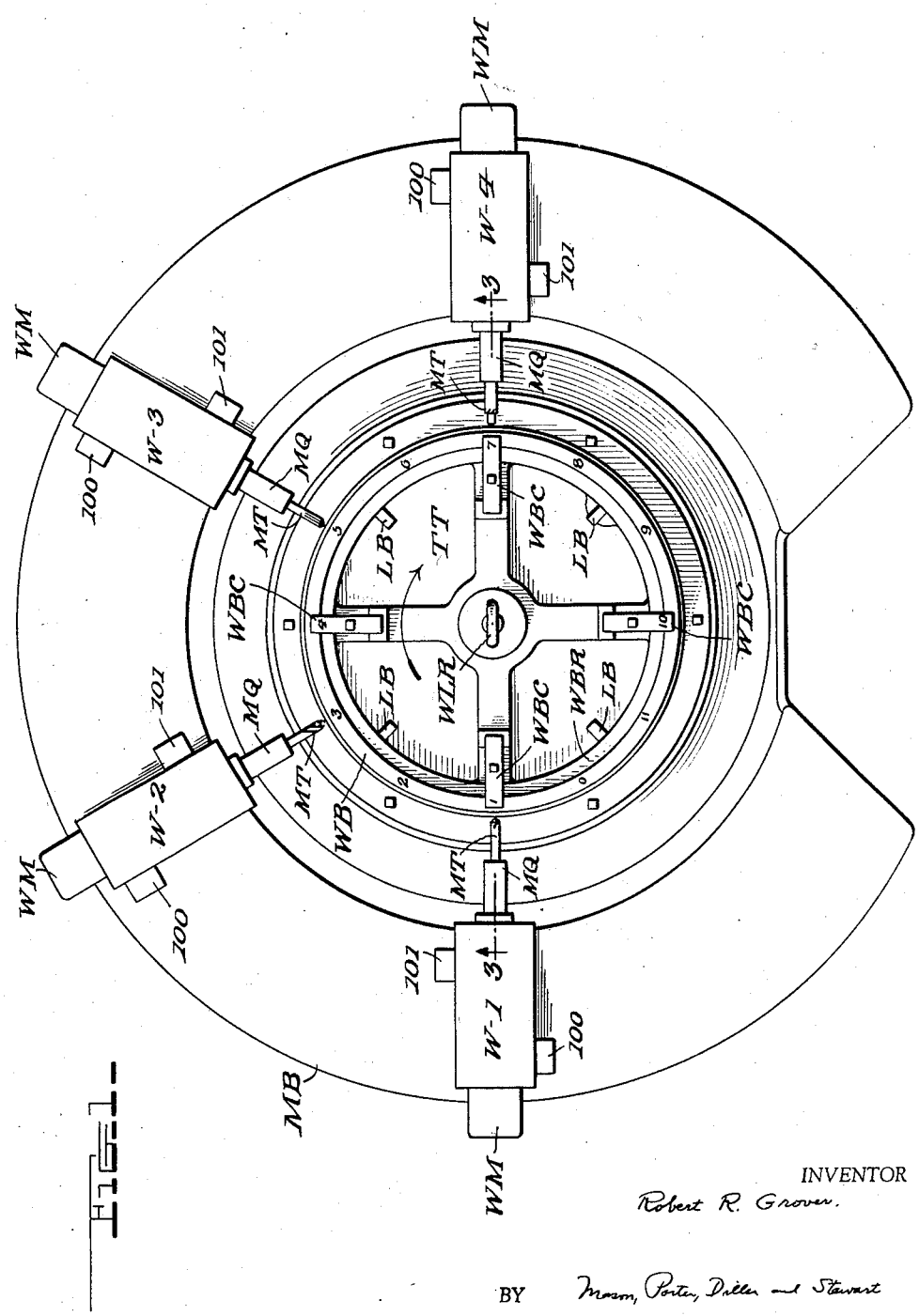
INVENTOR
Robert R. Grover.
BY Mason, Porter, Diller and Stewart
ATTORNEYS

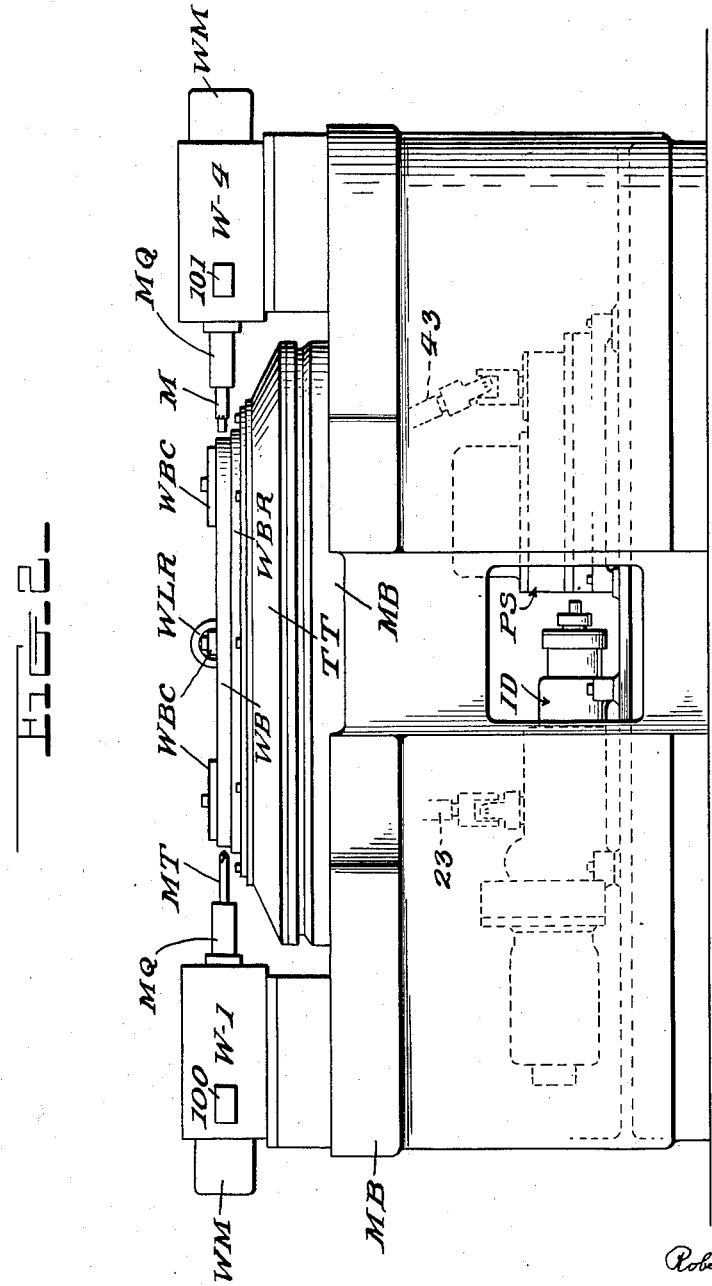

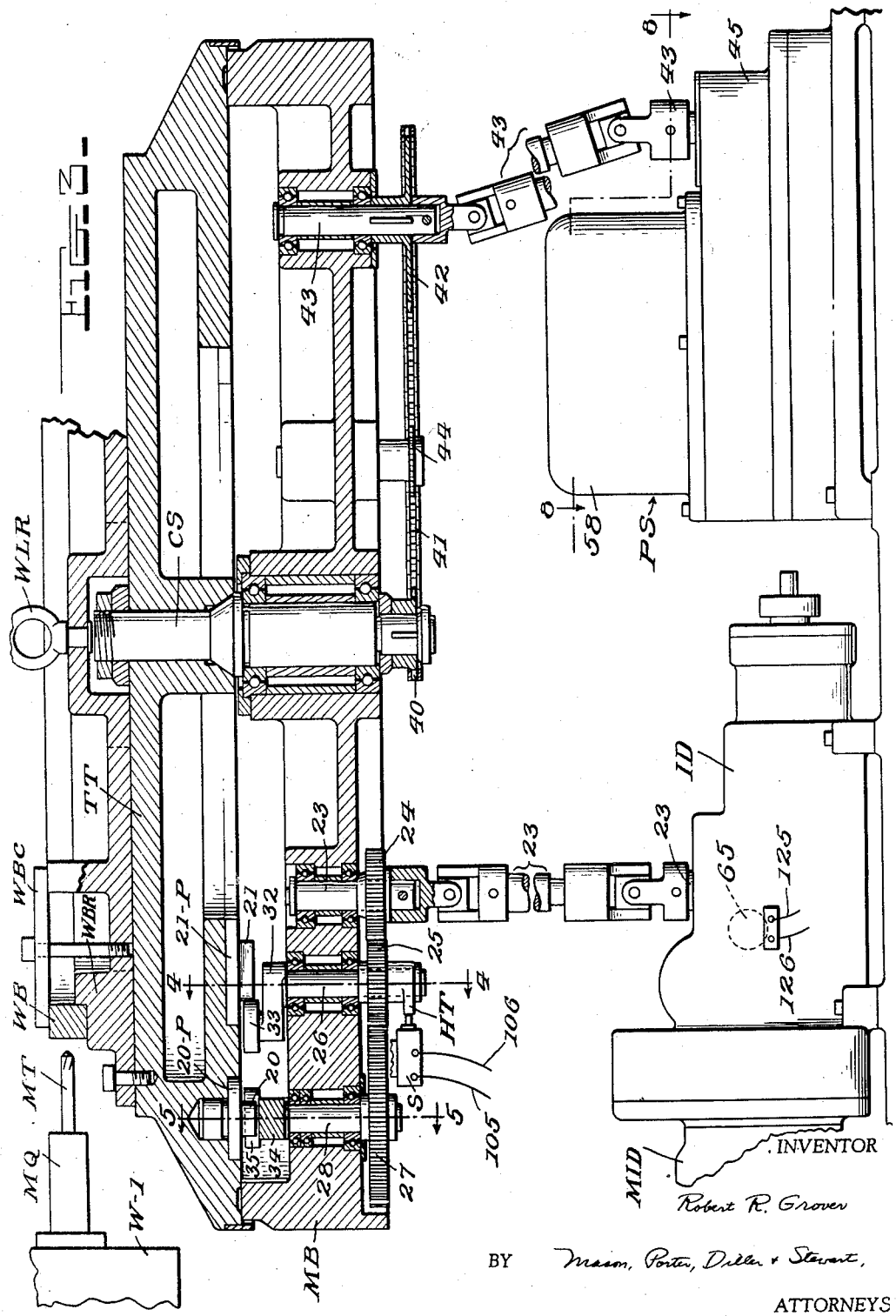

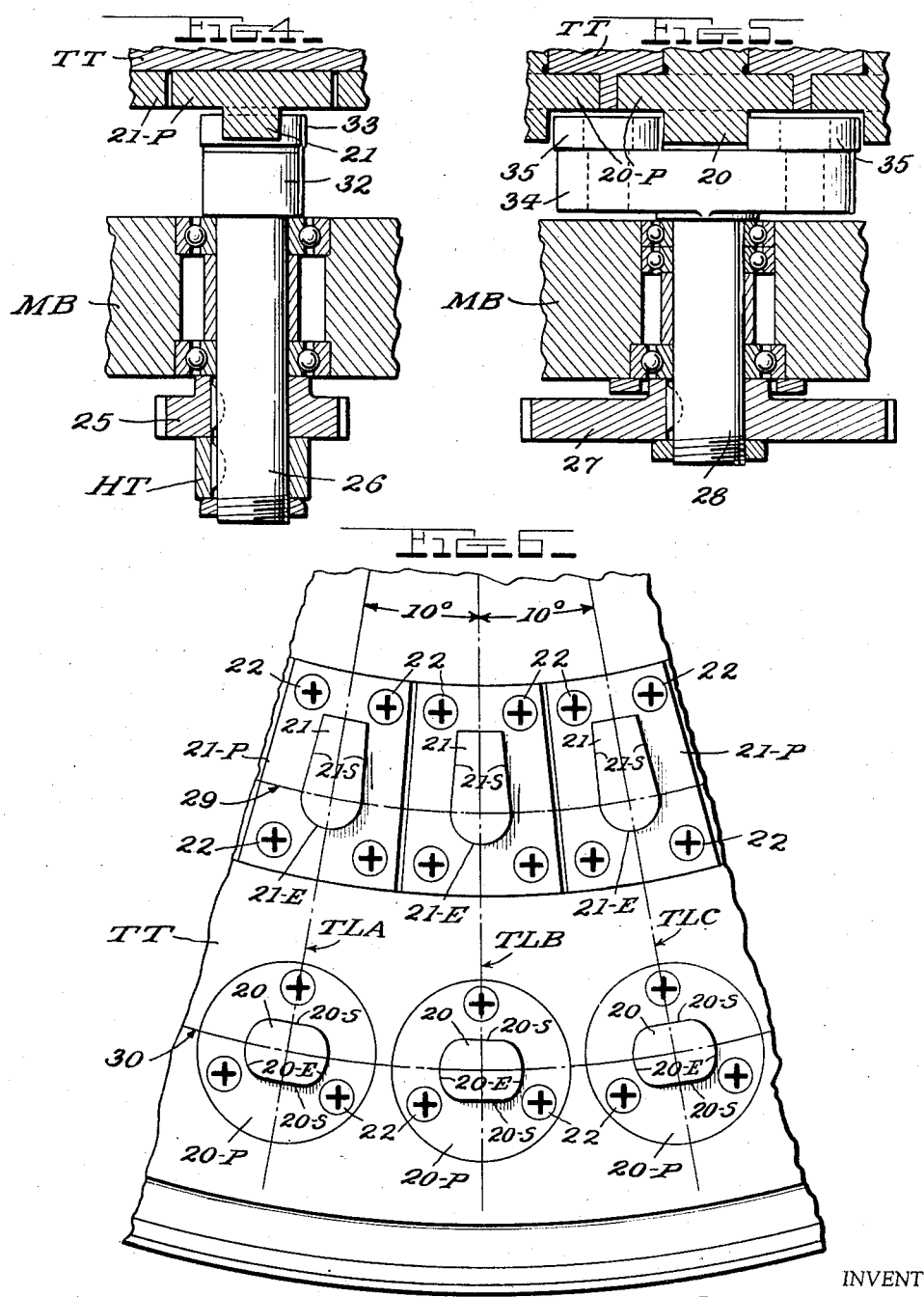

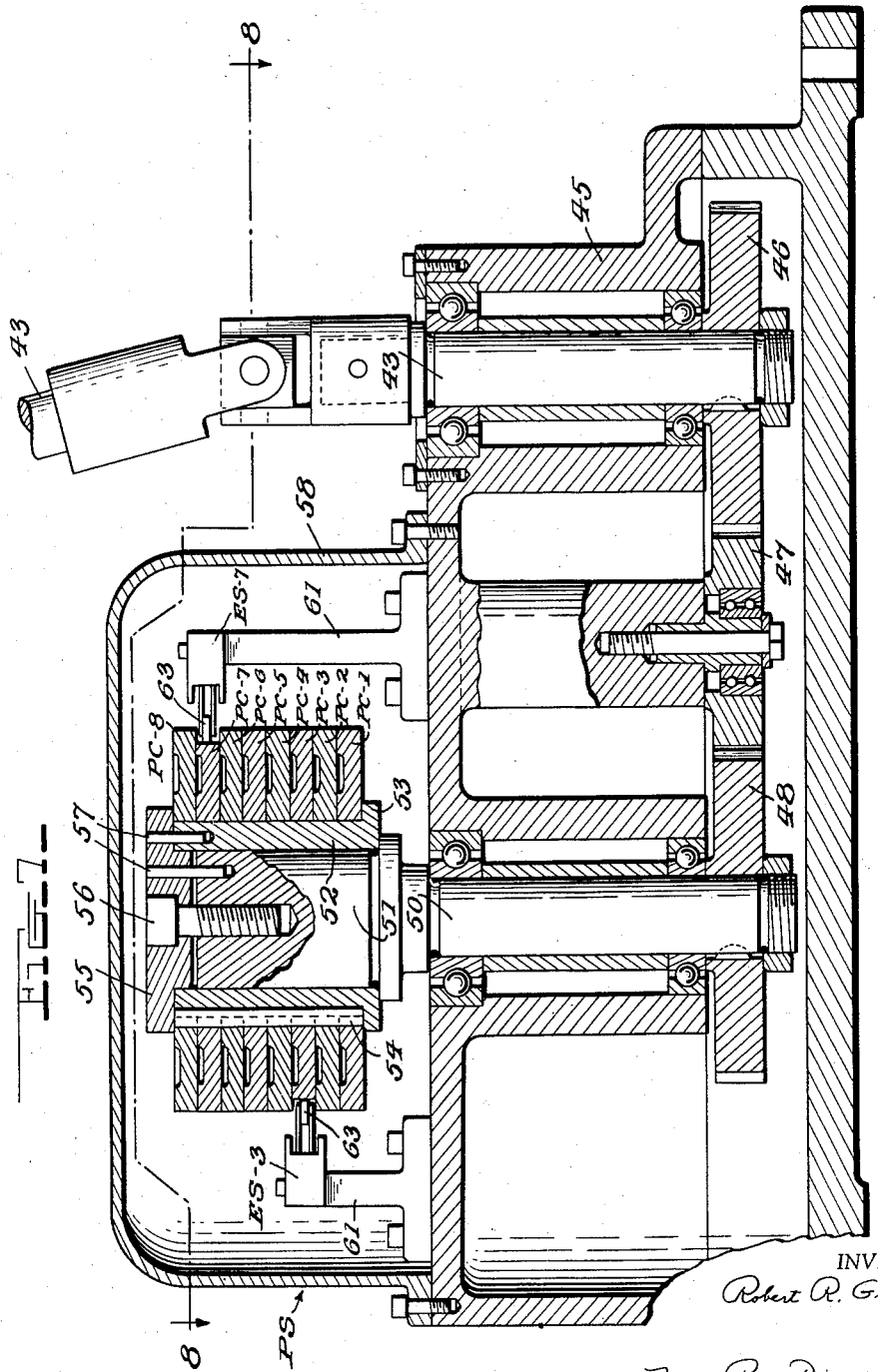

July 15, 1958 R. R. GROVER 2,842,985
MULTIPLE INDEXING MACHINE TOOL WITH PROGRAM SYSTEM
Original Filed March 3, 1954 11 Sheets-Sheet 6
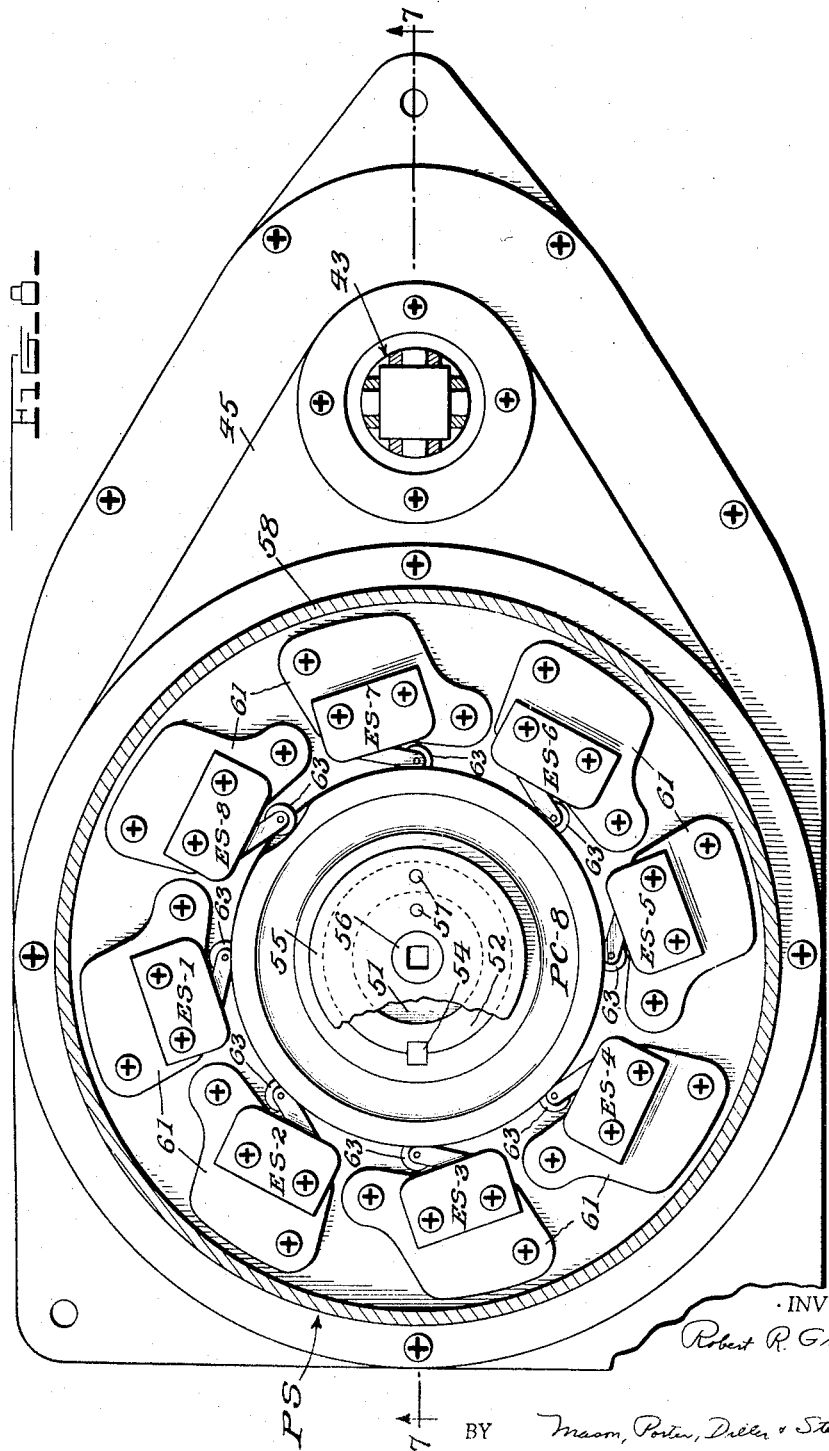
INVENTOR
Robert R. Grover
BY Mason, Porter, Diller & Stewart
ATTORNEYS July 15, 1958  R. R. GROVER  2,842,985
MULTIPLE INDEXING MACHINE TOOL WITH PROGRAM SYSTEM
Original Filed March 3, 1954  11 Sheets-Sheet 7
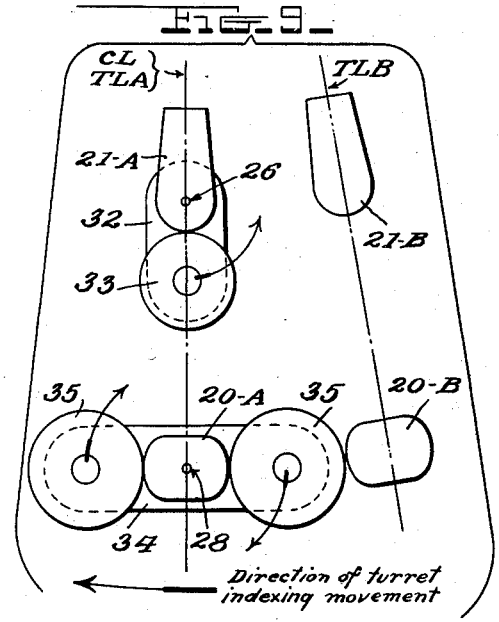
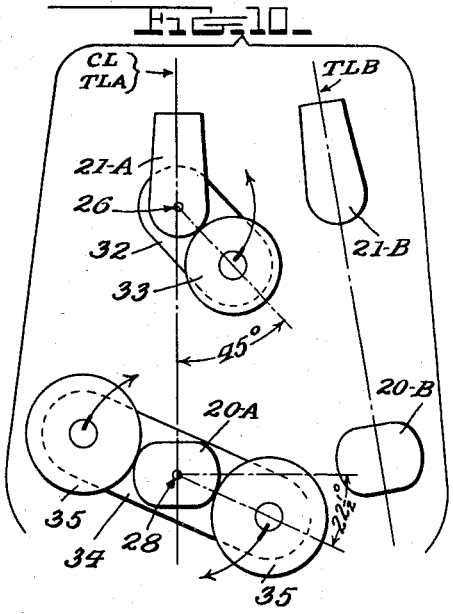
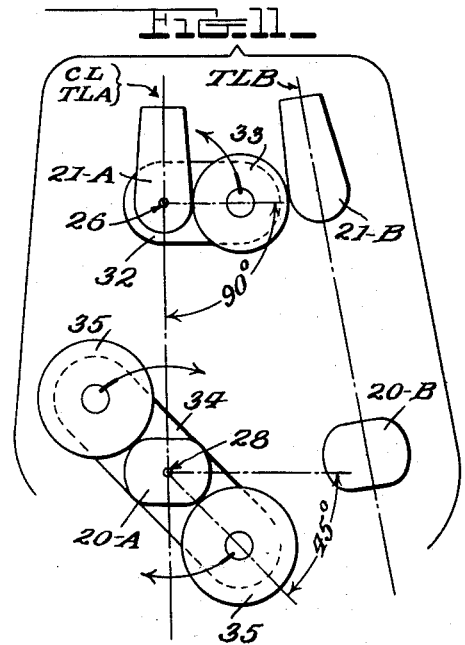
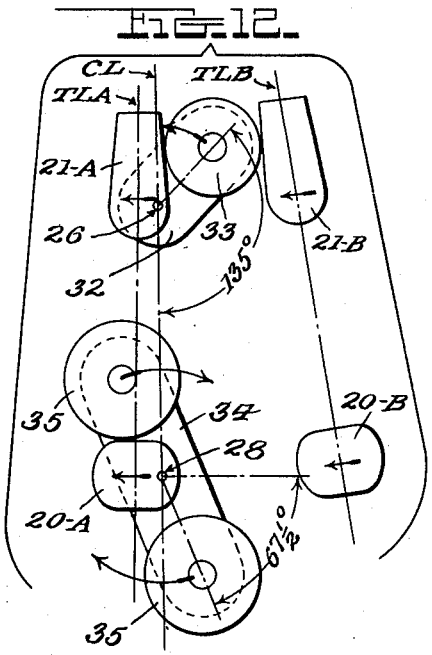
INVENTOR
Robert R. Grover
BY Mason, Porter, Diller & Stewart
ATTORNEYS

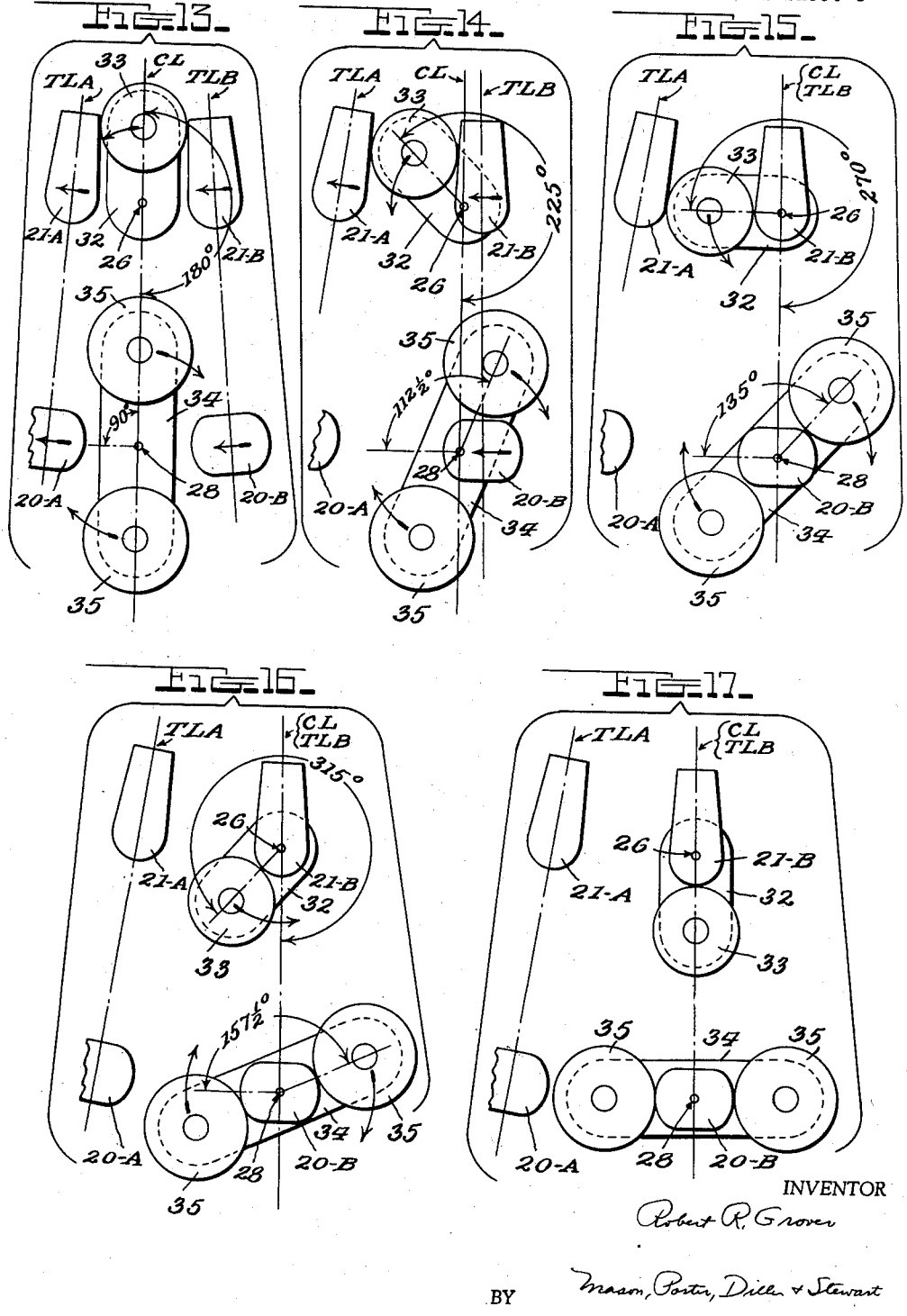

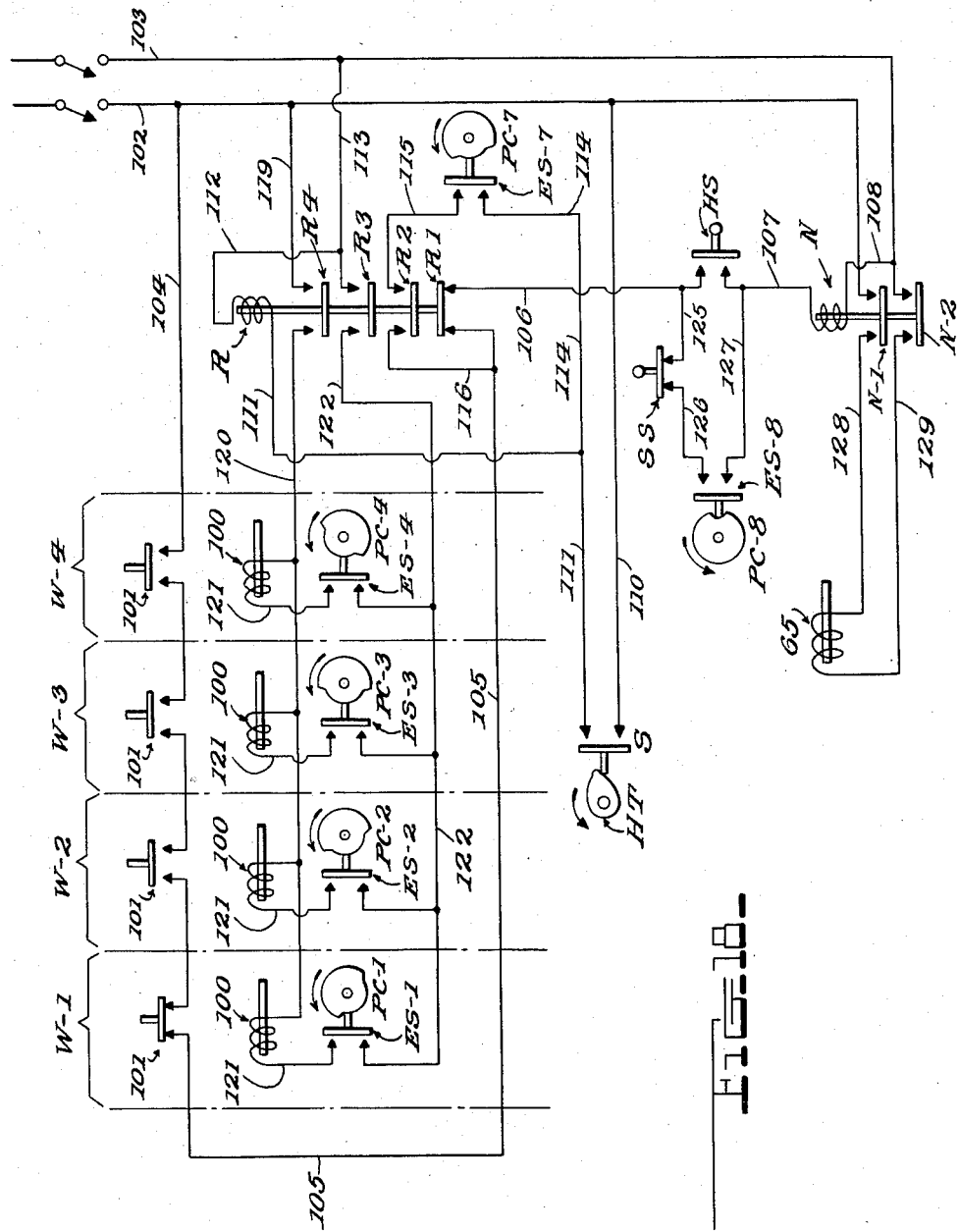

July 15, 1958 R. R. GROVER 2,842,985
MULTIPLE INDEXING MACHINE TOOL WITH PROGRAM SYSTEM
Original Filed March 3, 1954 11 Sheets—Sheet 10
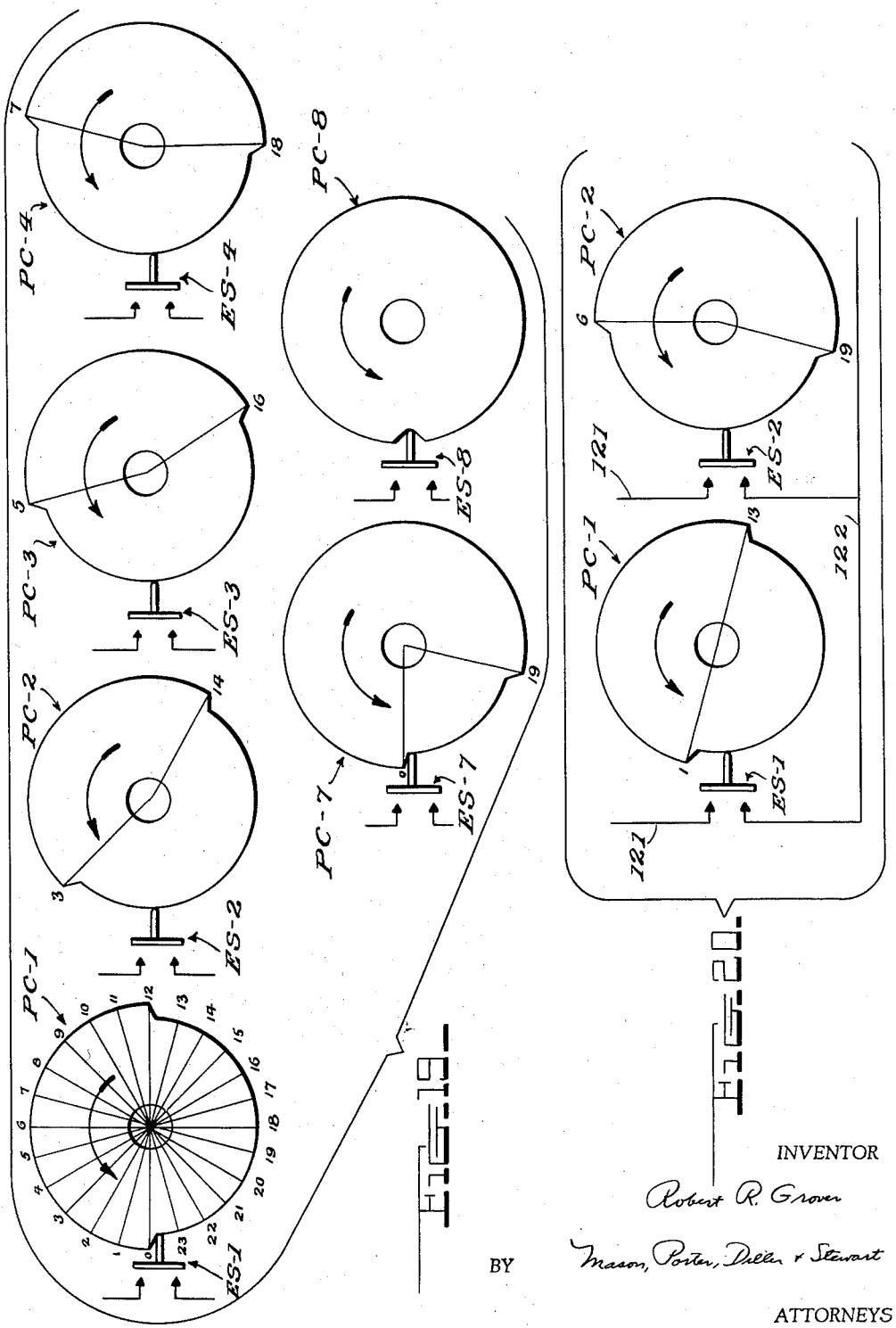
INVENTOR
Robert R. Grover
BY Mason, Porter, Diller & Stewart
ATTORNEYS July 15, 1958 R. R. GROVER 2,842,985
MULTIPLE INDEXING MACHINE TOOL WITH PROGRAM SYSTEM
Original Filed March 3, 1954 11 Sheets-Sheet 11
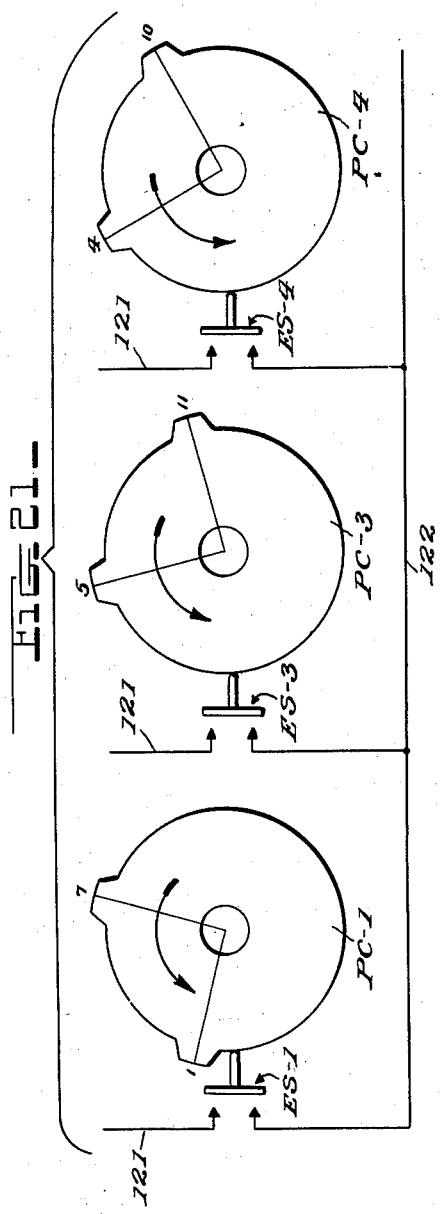
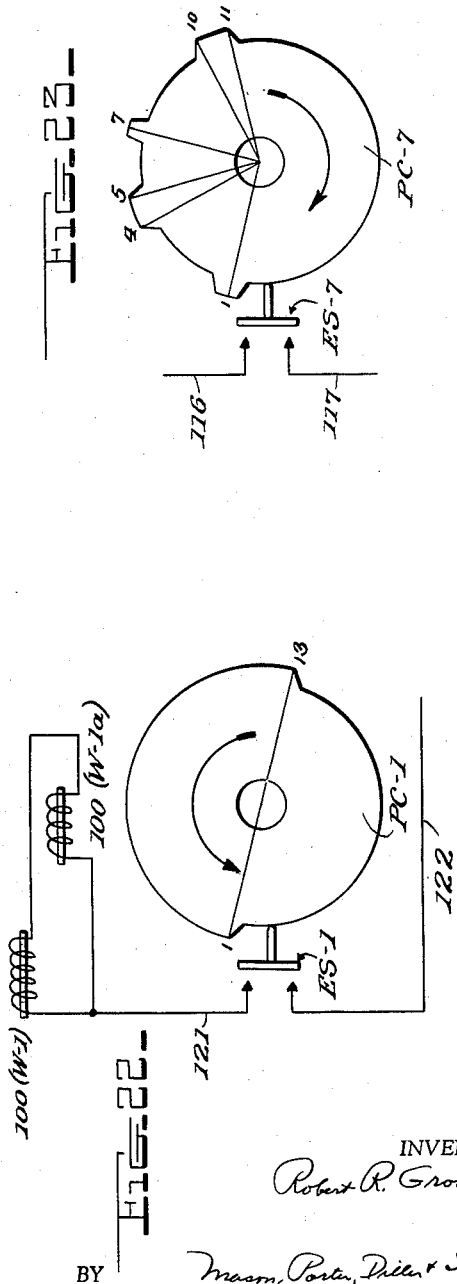
INVENTOR
Robert R. Grover
BY Mason, Porter, Diller & Stewart
ATTORNEYS

United States Patent Office 2,842,985
Patented July 15, 1958

2,842,985
MULTIPLE INDEXING MACHINE TOOL WITH PROGRAM SYSTEM

Robert R. Grover, Westport, N. H., assignor to Kingsbury Machine Tool Corporation, Keene, N. H., a corporation of New Hampshire Original application March 3, 1954, Serial No. 413,820, now Patent No. 2,821,870, dated February 4, 1958. Divided and this application February 17, 1955, Serial No. 488,839

12 Claims. (Cl. 77—26)

This invention relates to improvements in automatic turret-type machine tools, which include a base upon which is mounted a rotatable turret and a plurality of tool units for performing operations upon the work, and in which the turret is rotated by intermittent indexing steps whereby the work is successively presented opposite the tool units.

Such a machine is shown with general parts in the Kingsbury Patents Nos. 1,975,007 and 1,975,008.

This patent application is a division of my copending application Ser. No. 413,820, filed March 3, 1954, now Patent No. 2,821,870, issued February 4, 1958.

A feature of the invention is the provision of a machine having multiple work units, a turret with indexing mechanism, and interconnecting means for procuring alternate indexing and work operations in successive sub-cycles, and including means for preventing operation of one or more work units at predetermined sub-cycles.

Another feature is the provision of a machine having multiple work units, a turret with indexing mechanism including a part which moves initially without advancing the turret, then advances the turret, and finally completes its movement without advancing the turret, and interconnecting means for procuring alternate indexing and work operations in successive sub-cycles, including a control actuated by the said part during its final movement to initiate operation of work units.

Another feature is the provision of a machine having a work unit, a turret with indexing mechanism, and interconnecting means for procuring alternate indexing and work operations in successive sub-cycles and including means for effecting an indexing operation without an accompanying work operation at a selected position of turret indexing.

A further feature is the provision of a machine having a work unit, a turret with indexing mechanism, and inter-connecting means for procuring alternate indexing and work operations in successive sub-cycles, including means controlled from the turret and work units, for initiating successive indexing movement until the work has been performed and the turret is back at its original position, and means controlled from the turret for initiating operation of the work unit and for preventing operation of the work unit at a predetermined indexed position of the turret.

Another feature is the provision of a machine having multiple work units, a turret with indexing mechanism, and interconnected means for procuring alternating indexing and work operations, and including a work operation controlling relay with an energizing circuit controlled by the work units to be energized when all work units are in withdrawn condition, an indexing relay with an energizing circuit including contacts in the work operaton relay, and means controlled by the turret for preventing energizing of the work operation relay at predetermined indexed positions of the turret.

A further feature is the provision of an indexing mechanism which has supervisory devices for controlling the initiation and termination of the movements of the turret and the tool units and includes a program structure for selectively determining the operation or idleness of the individual tool units during the working period between indexing operations.

With these and other features as objects in view, as will appear in the following description and claims, an illustrative form of practice is shown on the accompanying drawings, in which:

Fig. 1 is a plan view, on a small scale, of a machine embodying the present invention, in which a turret is indexed through twelve equal angles per rotation, and four successive work operations are to be performed on the work piece at twelve equally spaced points.

Fig. 2 is a side elevation of the machine in Fig. 1, with parts of the base broken away to show internal structures.

Fig. 3 is a vertical section, on an enlarged scale and substantially on line 3—3 of Fig. 1, indicating the relative positions and cooperation of the index mechanism, the turret and the program structure.

Fig. 4 is a vertical section substantially on line 4—4 of Fig. 3.

Fig. 5 is a vertical section substantially on line 5—5 of Fig. 3.

Fig. 6 is a bottom view of a part of the turret table, showing indexing lug structures.

Fig. 7 is a vertical section substantially on line 7—7 of Fig. 8, through the program structure housing.

Fig. 8 is a horizontal section substantially on lines 8—8 of Figs. 3 and 7.

Figs. 9 to 17 are successive diagrammatic views showing the mechanical parts during the course of an indexing operation.

Fig. 18 is a circuit diagram.

Figs. 19, 20, 21, 22 and 23 are conventionalized diagrams showing cam sets employed for modified work operations.

When a turret machine tool is employed to make repetitive articles by successive drilling, reaming, tapping, counterboring, milling and like operations, each effected by a tool unit including a driving motor, an advanceable and retractable member carrying the proper tool, and a feeding mechanism for moving the member, conditions of tolerance demand that the work be properly and accurately positioned for the action of each tool unit in succession, and conditions of economy demand that a minimum time and energy by expended in indexing the turret so that the work is regularly moved past the tool units.

The illustrative form of practice shown in Figs. 1 and 2 is for the production of radial holes in a work piece WB at twelve equally spaced peripheral points, by the four successive operations at each point of spot drilling, drilling, reaming, and counterboring. The machine frame MB supports the four work units W–1, W–2, W–3 and W–4. Each work unit has a motor WM which is constantly running and acting to drive a tool and through a friction clutch to move a feed mechanism except when such mechanism is latched against movement; an individual solenoid shown conventionally at 100 being provided for disengaging the latch so that the feed mechanism can begin operation. Upon energization of the trip solenoid 100, the motor WM causes axial movement of the quill MQ so that the same moves forward a controlled distance to perform an operation by its tool MT and then retreats again into its original position and is relatched. As the feeding system moves the quill MQ, a supervisory switch 101 on the individual unit is immediately opened, and remains open until the quill has returned to its original position, whereupon the switch 101 is closed again. Such work units are known, for example in the aforesaid Kingsbury Patent 1,975,008. In Fig. 1, the work unit W–1 has its quill MQ provided with a spotting drill; the unit W–2 has a drill; the unit W–3 has a reamer; and the unit W–4 has a counterbore.

In the base MB of the machine is located an index drive ID having a motor MID which is constantly turning and endeavoring to move the drive through a friction clutch, but being prevented normally from such action by a latch controlled by the solenoid 65. When this solenoid is energized, the latch is momentarily raised to release the index drive ID, and then the latch at once returns to position for stopping the index drive after it has completed a revolution: if the solenoid is still energized at the completion of such revolution, the solenoid must be de-energized and re-activated before it can again release the latch, so that the single indexing sub-cycle effect is assured even if the circuit to the solenoid is held energized or if such energization for any reason should fail during the course of the sub-cycle, thereby avoiding double-indexing when not desired. Such overrunning solenoid-actuated latches are known, and the details thereof form no part of this invention. When this solenoid is energized, the index drive ID proceeds to produce rotation of the turret table TT through one indexing angle, which in the form of Figs. 1 and 2 is 30 degrees, so that twelve indexing movements are required for a full rotation of the turret table TT, and this table comes to rest successively in each of twelve positions. For simplicity of explanation, the initial position 0 is taken as the position immediately ahead of the first operation by the spotting drill at unit W–1, the turret table TT moving in a clockwise direction as shown by the arrow. The successive other positions are shown as 1, 2, 3, . . . 11, noting that a full rotation to the twelfth position brings the turret table TT back to position 0.

The turret table TT has fixture pieces thereon for accurately locating the work WB, which is held in position by ring WBR and the clamps WBC. In Figs. 1 and 2, the work WB is a ring which is to have twelve equally spaced radial holes formed in its rim by a succession at each hole of spot-drilling, drilling, reaming and counter-boring operations. In Figs. 1 and 3, the fixture ring WBR is illustrated as having spokes connected at the center to a lift ring WLR whereby the fixture may be lifted from the table TT by a crane, after release, and moved to a work bench and a new fixture ring with a new work blank WB thereon placed in the machine. Thus the work is placed in the fixture with care at the work bench, and its positioning in the machine is by locating blocks LB, followed by securing upon the turret table.

It has likewise been known, e. g. in the aforesaid Kingsbury patent, to have the turret formed with projections which are engaged by parts of the indexing system whereby the turret is held locked during the operation of the tool units, then unlocked and advanced by the indexing drive, and relocked before the tool units begin their new cycle of work.

According to the instant invention, the turret TT is provided with rows of locking lugs 20 and indexing lugs 21, each equal in number to the positions to be occupied by the turret in one rotation of 360 degrees. In the illustrated form, these are provided on the bottom of the turret table TT, Figs. 3–6, by being formed as pieces having securing plates 20–P, 21–P, from which the lugs extend. These plates are positioned in recesses (Fig. 3) in the table bottom. In this illustrated form, pairs of lugs are located (Fig. 6) along radial lines TLA, TLB, TLC through the turret axis, these lines being angularly spaced by the distance the turret is to be moved during indexing: each lug is symmetrical about its respective symmetry line. The locking lugs 20 have identical lengths in the circumferential direction of the machine, and have arcuate ends 20–E, the arcs being circular about centers at the symmetry lines; the inner and outer surfaces 20–S are flattened, and are joined to the surfaces 20–E by rounded corners. Each indexing lug 21 has a rounded outer end surface 21–E formed as a circular arc about a center on the symmetry line; and flattened sides 21–S which are shown as chordal relative to the turret center wherewith the adjacent sides of each two indexing lugs are parallel. The plates 20–P, 21–P are secured to the turret TT by screws 22.

The main indexing drive ID is connected to rotate the indexing shaft 23 by 360 degrees for each indexing movement in a sub-cycle. The shaft 23 is illustrated as including universal joints so the index drive ID may be located in a desired part of the machine base. Gear 24 on the shaft 23 is in mesh with gear 25 on shaft 26, and gear 25 in turn is in mesh with gear 27 on the shaft 28. Gears 24 and 25 have the same number of teeth so that shaft 26 turns through 360 degrees in the direction of the arrow (in each of Figs. 9–16) for each indexing cycle, while gear 27 has twice as many teeth so that it turns through 180 degrees in each indexing cycle. The axis of shaft 26 intersects the circle 29 (Fig. 6) through the centers of the rounded ends of the indexing lugs 21, i. e. it is in the plane of Fig. 4; and the axis of shaft 28 intersects the circle 30 (Fig. 6) through the centers of the locking lugs 20, i. e. it lies in the plane of Fig. 5.

The shaft 26 carries a crank arm 32 upon which is mounted an indexing roll 33 with its axis parallel to the shaft axis and spaced therefrom: the roll 33 is located in the horizontal plane of the indexing lugs 21 and serves to advance these lugs one for each indexing cycle. The shaft 28 carries a double crank arm 34 upon which is mounted a pair of locking rolls 35 whose axes are parallel to but offset from the shaft axis by equal distances so that the rolls 35 are diametrically opposite one another and in the horizontal plane of the locking lugs 20, the rolls being spaced apart a slightly less distance from the peripheral dimension (i. e. between surfaces 20–E) of the individual locking lugs so that a preliminary resilient tension exists in the parts to avoid looseness or backlash.

The central shaft CS projects below the turret table TT and carries a sprocket 40 having thereon a chain 41 which passes around the driven sprocket 42 on the shaft 43. An adjustable idler sprocket 44 also engages the chain 41 and prevents looseness or backlash in the drive. The shaft 43 includes universal joints for a like purpose to that of the joints in shaft 23, and has its lower end journalled in the housing 45 of a program structure PS. The ratio between the sprockets 40 and 42 is determined by their respective numbers of teeth, and may be selected according to the action desired, such as 1:1, 1:2, 1:4, in the illustrated form, the ratio is 1:2.

The shaft 43 has (Fig. 7) a gear 46 which meshes with idler 47 and thence drives a gear 48 on the program shaft 50 likewise journalled in the housing 45 and having an enlarged end 51. A cam receiving sleeve 52 fits closely around the end 51 and has a lower end flange 53. A plurality of programming cams PC–1, PC–2, PC–3, . . . PC–8 are mounted on the sleeve 52, eight such cams being shown, for controlling separate operations by as many as six work units performing at different times: four such units W–1, W–2, W–3, W–4 being illustrated and described as to operations: with cams PC–7 and PC–8 being employed for group controls as described hereinafter. Each cam has a keyway for receiving a key 54 which also engages in the sleeve 52. Preferably the sleeve is longer than the shaft end 51, and a securing plate 55 engages the outermost cam PC–8 and holds the cam nest tightly in place when the clamping screw 56 is tightened. To assure uniformity, the plate 55 has a portion extending into the sleeve 52, and dowels 57 are employed for cooperation with the key 54 in maintaining the proper position of the cams relative to the driving system. A cover 58 encloses the cam nest against accident. It will be noted that quick changes in operation can be effected by removing the cover 58, removing the screw 56, and taking off the cam nest comprising the sleeve 52 with plate 55 and the cams; and replacing with another cam nest which has been already set up.

The individual cams have elevations or lobes, and depressions or sinks in their peripheries for effecting operations of electrical switches ES–1, ES–2, ES–3 . . . ES–8, eight being shown in Fig. 8, of which switches ES–1 to ES–6 cooperate with program cams PC–1 to PC–6 in determining individual operation of each of six working systems, of which four are described in connection with Figs. 1 and 2, and Figs. 18–23: and switches ES–7 and ES–8 cooperate with cams PC–7 and PC–8 for group controls, noting Fig. 18. These switches are illustratively of the commercial type known as microswitches, being each supported from the housing 45 by a post 61 as shown in Fig. 7: the height of each post being determined by the position of the cam PC–1 . . . PC–8 which is to control the specific switch. Each switch has a roller 63 for trailing movement on the respective cam surface. In the illustrated form the switches are of the so-called normally open type, i. e. in the absence of external force, the contacts are electrically disengaged by spring action. In the presence of an elevated or lobe portion of the associated cam, the roller 63 is forced away from the cam nest axis and the switch is closed. As each cam presents a depression or sink to the respective roller 63, the switch opens by the spring action; but it is closed again when the cam advances the depression from opposite the roller.

Shapes for program cams, for specific cases, are shown in Figs. 19 to 23. In these figures the radial lines, with peripheral numerals 0 to 23 indicate the rest positions of the program structure between indexing movements. For simplicity of this description, the turret is assumed to have twelve successive work positions during one complete rotation, and the drive from the indexing unit to the program structure to have a 2:1 speed reduction, so that during the first turret rotation a program structure movement from position 0 to position 12 occurs: and during the next complete turret rotation, the program structure moves in the same direction of rotation, from position 12 to 0, thus returning in cycle to its zero position. The program structure can be set up, as indicated by Figs. 19 to 23, to perform any operation at each turret position by any desired number of work units for which the total machine is adapted, with the units arranged in any position and order on the machine relative to one another, whereby their tools encounter and act on the work blank in the desired way and location, the cams being shaped to effect a second operation by a second tool only after the first tool has performed: to pass any position or positions idly without any work being performed thereat: and in the illustrated form to bring the turret to final rest, after a full cycle, in its initial position so that the finished piece of work can be removed and a new work blank inserted with employment of locating parts fixed on the turret, ready for a new cycle to be started, in which this new blank is completely worked and the turret again returned to its initial position.

The electrical circuits are shown in Fig. 18, in which power is supplied by the conductors 102, 103 from the power mains, with inclusion of a main switch for interrupting the current supply. A branch 104 from conductor 102 connects the work unit switches 101 in series, these switches being closed when the respective work units are in retracted position and opening immediately as the work units leave such retracted position. The conductor 105 extends from the switches 101 and is controlled by the normally closed bridge R–1 of a relay R, so that while all switches 101 are closed, a circuit continues by conductor 106, hand switch HS, conductor 107 and the coil of a relay N, with return by conductor 108 to the mains conductor 103. A branch 110 from conductor 102 leads to the switch S which is controlled by the indexing cam HT, so that when switch S is closed current flows to conductor 111 and thus to the coil of relay R, with a return by conductors 112, 113 to mains conductor 103. A branch from conductor 111 extends by conductor 114 to the master switch ES–7 controlled by program cam PC–7, continuing by conductor 115 to a contact of the normally open bridge R–2 of relay R, the other contact with this bridge being connected by conductor 116 to conductor 105.

Another branch from conductor 102 extends by conductor 119 to a normally open contact opposite a bridge R–4 of relay R, and continues by conductor 120 and is connected to the work unit releasing solenoids 100 in parallel. Each of these solenoids is controlled by a respective switch operated by a program cam: thus switch solenoid 100 of work unit W–1 has a switch ES–1 controlled by program cam PC–1: switch solenoid 100 of work unit W–2 has a switch ES–2 controlled by program cam PC–2; switch solenoid 100 of work unit W–3 has a switch ES–3 controlled by program cam PC–3; and switch solenoid 100 of work unit W–4 has a switch ES–4 controlled by program cam PC–4. Each solenoid 100 is connected by a conductor 121 to a contact of its respective switch, and the other contact of each switch is connected to the conductor 122 which leads to a contact of the normally open bridge R–3 of relay R, this bridge effecting closure to a contact connected to conductors 112, 113; wherewith the unit groups of a solenoid 100 and the corresponding switch ES–1, ES–2, ES–3, ES–4 are in multiple betwen conductors 120 and 122, for circuit closure when the relay R is energized.

To provide fully automatic cyclic operation under control of the program system, a switch ES–8 is controlled by program cam PC–8. A conductor 125 branches from conductor 106 and is controlled by the selector switch SS, the circuit continuing through conductor 126 to a contact of switch ES–8, and from the other contact of this switch by conductor 127 to conductor 107 at the opposite side of the hand switch HS. Thus, the normally open hand switch HS can close a shunt to the path through switches SS and ES–8.

A relay N has two normally open bridges N–1, N–2 having contacts connected to the mains conductors 102, 103 so that when the relay N is closed, current will flow through conductor 128 to the unlatching solenoid 65 of the indexing unit, with return by conductor 129.

In Figs. 9 to 17 are shown the mechanical cooperation of indexing members, during the course of a single indexing movement. In the illustrated form, the parts are symmetrical and the turret may be operated in either direction by reversing the rotation of its drive shaft 23. In these figures, the turret table is assumed removed while leaving the lugs thereon in position for cooperating with the three rollers 33, 35, 35, all parts being shown in outline for simplicity, and with the fixed centers of shafts 26, 28 shown by small circles.

Fig. 9 represents the parts with the turret table locked against peripheral movement and with the intermittently rotating indexing mechanisms in position to start an indexing movement. A radial line CL passes through the centers 26, 28 of the corresponding shafts, and the roller 33 is being presented by the crank arm 32 with the roller axis on line CL, that is, the roller 33 is in line with and opposite a first indexing lug 21–A, being located symmetrically opposite the rounded outer end 21–E (Fig. 6) thereof. The two rollers 35, 35 are positioned by the arm 34 opposite the rounded ends of the locking lug 20–A which forms a pair with the turning lug 21–A, these rollers 35 having a tight grip against the ends of the lug 20–A so that this lug is prevented from any peripheral movement, and correspondingly the turret table is being still held locked against such motion as it was while the work units W–1, W–2, etc., were operating during the final portion of the preceding subcycle. The lugs 20-A and 21-A are located on a radial line TLA of the turret table which in Fig. 9 is coincident with the line CL of the machine base.

The next succeeding pair of lugs 20-B and 21-B are also located on a radial line TLB of the turret table, each lug being symmetrical wtih respect to such line.

In the illustrated form, the rollers 35 are slightly less in diameter than the peripheral spacing distance between lugs 20-A, 20-B: and the spacing between adjacent of surfaces of the two rollers 35 is greater than the distance between surfaces 20-S (Fig. 6) of locking lugs 20-A, 20-B, etc. The diameter of roller 33 is somewhat less than the spacing between adjacent surfaces of the indexing lugs 21-A, 21-B, etc.

In Figs. 9 to 17, the turret table is to move in a clockwise direction, wherewtih the succession of lugs 21-A, 21-B, etc., is to move in a clockwise direction: with a similar movement of the succession of locking lugs 20-A, 20-B, etc. The roller 33 is carried by its crank arm 32 in a counter-clockwise direction about the axis of shaft 26. The rollers 35 are carried in a clockwise direction by their arm 34 about the axis of shaft 28. When the indexing drive unit ID is released by energization of its solenoid 65, the shaft 23 begins to turn, and therewith the crank arms 32, 34 begin to move and carry the rollers 33, 35, 35 in the directions stated and as shown by the arrows.

During the first 45 degrees of movement, into the position of Fig. 10, the rollers 35 travel with pressure along the end surfaces 20-E of lug 20-A, these surfaces being concentric with the center of lug 20-A which in Figs. 9, 10 and 11 is itself coincident with the axis of shaft 28. During the course of this movement, the turret table remains locked against peripheral movement. During this time, also, the roller 33 is passing idly along the outer end of lug 21-A which has a curved surface concentric during this period with the axis of shaft 26.

During the next succeeding movement of 45 dagrees of the roller 33 to a total of 90 degrees, it enters between the lug 21-A and the next succeeding lug 21-B: and the corresponding half-angle motion of rollers 35, 35 advance these through a total distance of 45 degrees as shown in Fig. 11, in which they now leave contact with the lug 20-A. That is, in the position of Fig. 11, the locking rollers 35 have ceased to exert locking pressure, and the indexing roller 33 is ready to begin action against a radial side surface of the lug 21-A to effect indexing movement of the turret table TT.

During the next 45 degrees of movement of the roller 33, into the position of Fig. 12, it acts on the lug 21-A to cause a gradual acceleration of movement of this lug and of the turret table: the rollers 35 now being free of the locking lug 20-A. It will be noted in Fig. 12 that the symmetry line TLA through the lugs 20-A, 21-A is no longer coincident with the center line CL of the machine, representing a partial indexing movement of the turret table relative to the machine base.

During the next 45 degrees of movement of the roller 33, into the position of Fig. 13, wherewith the roller 33 has traveled a total of 180 degrees about the axis of shaft 26, the rate of motion of the turret table increases and therewith the line TLA of lugs 20-A, 21-A is moved farther from the machine center line CL, and the lug 20-A has passed from between the rollers 35, which have now moved a total of 90 degrees from the position of Fig. 9.

During the next 45 degrees of movement of the roller 33 about the axis of shaft 26, into the position of Fig. 14, the roller 33 continues to roll and press against the same side of lug 21-A, to move the same but at a decreasing rate as the angle of presentation by the crank arm 32 changes: therewith, the next locking lug 20-B begins to enter between the locking rollers 35.

As the roller 33 completes the next 45 degrees of movement into the position of Fig. 15, it completes its rolling and pressure against the lug 21-A, and the turret table comes gradually to rest from this advancing action by roller 33, overrunning of the turret table TT being prevented as the next lug 21-B is opposite the roller 33 in the successive positions of Figs. 11 to 15: at the same time, in moving to the position of Fig. 15, the locking rollers 35 now advance to a position in which they are about to engage the curved end surfaces 20-E of the next locking lug 20-B, it being noted that the radial symmetry line TLB of lugs 20-B, 21-B has been advanced from the position of Fig. 9 until it is now coincident with the machine center line CL. At this stage, the turret has been roughly advanced by the desired angular distance, i. e. the angle between lines TLA and TLB, but the indexing shaft 23 is continuing to turn.

During the next 45 degrees of movement of the roller 33 into the position of Fig. 16, it moves along the curved outer surface 21-E (Fig. 6) of the lug 21-B without moving the turret table TT: and simultaneously the locking rollers 35 engage the curved ends 20-E of the lug 20-B and begin moving therealong, under the pre-established pressure provided in this roll mounting and by the relative at-rest spacing between adjacent roller surfaces, in comparison to the diameter of these end surfaces 20-E of lug 20-B.

At the succeeding 45 degrees of movement of roller 33, it completes an idle movement along the curved outer surface 21-E of lug 21-B until it has moved through a full 360 degrees about the axis of shaft 26 and is now back in the starting position of Fig. 9. Correspondingly, the rollers 35 have turned through a final 22½ degrees, so that they have completed a movement of 180 degrees from the position of Fig. 9: and are again engaged under pressure with the end surfaces 20-E of the locking lug 20-B and are holding this lug and therewith the turret table TT against peripheral movement and in a position which can be accurately determined by the positioning of the lug 20-B on the bottom of the turret table.

Thus, in the indexing movement of a sub-cycle, as shown by Figs. 9 to 17 inclusive, the roller 33 has moved through 360 degrees about the axis of shaft 26, rolling and pressing against a turning lug 21-A and causing this lug to move through approximately the angular indexing distance for the turret table TT: and simultaneously the pair of locking rollers 35 have turned through an angle of 180 degrees about the axis of shaft 28, detaining the locking lug 20-A until the turning roller 33 is ready to act in a position (Fig. 11) between the lugs 21-A, 21-B, then releasing the lug 20-A (Fig. 12) so that it may move freely as the lug 21-A is driven, with entry of the succeeding locking lug 20-B into position, and followed by an engagement and gripping of the lug 20-B to hold the turret table in the new position. It will be noted that the radial symmetry line TLA of the lugs 20-A, 21-A on the turret table remains coincident with the machine center line CL through the axes of shafts 26, 28, in the positions of Figs. 9, 10 and 11: and that the radial symmetry line TLB of the new lugs 20-B, 21-B is coincident with the center line CL in the positions of Figs. 15, 16 and 17, wherewith the shafts 26, 28 and therewith the drive shaft 23 perform parts of their motion under conditions when the turret table is either positively locked, or is detained against any major displacing movement. Accordingly, the cam HT (Figs. 3, 4 and 18) can turn through a substantial angle, and effect the closing and succeeding reopening of the switch S during passage from the position of Fig. 16 to that of Fig. 17: and correspondingly the work units W-1, W-2 can be started upon closure of the switch S, allowing for relay delay times, without any movement occurring in the turret table even though the index drive ID has not come fully to rest before the work units begin action, wherewith there is saving of total machine time per unit of work produced.

During the next succeeding sub-cycle, the lug 20–B is correspondingly released and the lug 21–B actuated, until a new pair of lugs 20, 21 are brought to the position of lugs 20–B, 21–B in Fig. 17: and this is repeated for each sub-cycle.

The operation of the electrical elements depends upon the positions of the hand switch HS and the selector switch SS. For semi-automatic operation, the selector switch SS is left open, and therewith the program cam PC–8 has no effect of causing a continuation of sub-cyclic indexing and tool movements: and each sub-cycle is then initiated by momentary closure of the hand switch HS. For fully automatic operation, the selector switch SS is closed, and then the hand switch HS is operated momentarily for starting a complete program cycle under control of the program cam PC–8 as will be described below.

In the illustrative setup, work unit W–1 is to be brought into operation after the first indexing step, unit W–2 after the third indexing step, unit W–3 after the fifth indexing step, and unit W–4 after the seventh indexing step, corresponding to the peripheral spacing of the work units about the turret table by angles of 60 degrees, being twice the work position angle; with the work units continuing in cyclic operation until program cam PC–1 causes stoppage of unit W–1; after two further indexing movements program cam PC–2 causes stoppage of work unit W–2, and after the second further indexing movement of two spaces, program PC–3 causes stoppage of work unit W–3 and program cam PC–4 causes stoppage of work unit W–4 after the third further indexing movement of two spaces: then a number of idle indexing movements are accomplished without any operations of units W–1, W–2, W–3, W–4. The cam for the purpose are conventionally shown in Fig. 19.

When released by the action of solenoid 65, the index drive shaft continues to turn the program cams and begins indexing of the turret.

At the start of an operation, the work is positioned and secured on the turret. The turret is in position 0. All work units W–1, W–2, W–3, W–4 are in retracted position, with their switches 101 closed. The program cams PC–1, PC–2, PC–3, PC–4 are in position 0 for opening of the associated switches ES–1, ES–2, ES–3, ES–4. Switches ES–7 and ES–8 are likewise in open position 0, by the action of their program cams PC–7 and PC–8. The relay R is deenergized. Cam HT is presenting switch S in open position. Relay N is deenergized. It will be assumed that all motors are running and the selector switch SS is closed for fully automatic operation.

The operator now closes the hand switch HS. A circuit is now established from conductor of 102 through conductor 104 and the closed series switches 101, conductor 105, closed bridge R–1 of relay R, conductor 106, hand switch HS, conductor 107, the coil of relay N, conductor 108 back to mains conductors 103. Relay N is energized and closes its bridges N–1 and N–2 and thus energizes the solenoid 65 which unlatches the index drive unit. The index drive unit ID starts to turn the index drive shaft 23 and the program structure on which are mounted the program cams PC–1, PC–2, PC–3, PC–4, PC–7, PC–8. As soon as cam PC–8 closes switch ES–8, a shunting circuit is established from conductor 106 by conductor 125, the closed selector switch SS, conductor 126, switch ES–8, and conductor 127 to conductor 107, and the hand switch HS may now be released without affecting the operation during a full program cycle.

This indexing of the turret continues until it is in position 1 and its motion is zero, which occurs (Fig. 16) prior to complete stoppage (Fig. 17) of the index drive system as described above: the index shaft 26 continues briefly in rotation and its cam HT momentarily closes the switch S after the turret motion has stopped, and then reopens this switch S just as the drive shaft 23 is stopped. The momentary closure of switch S permits current to flow from conductor 102 through conductor 110, switch S, conductor 111, the coil of relay R, and back by conductors 112, 113 to mains conductor 103, so that the relay R is energized. In moving, relay R opens its bridge R–1 and closes bridges R–2, R–3, and R–4. The movement in the program structure has caused program cam PC–7 to close its switch ES–7, so that current can flow from conductor 105 by conductor 116, relay bridge R–2, conductor 115, switch ES–7, conductor 114, conductor 111, to the coil of relay R, thus maintaining its energization even though the switch S opens shortly thereafter.

By the movement in relay R, the bridge R–1 has deenergized conductor 106, and relay N is deenergized even though the selector switch SS and the program switch ES–8 remain closed. Solenoid 65 is deenergized, and prepares for detention against further movement of the index drive shaft 23 and the latter comes to rest, when it has completed a full rotation and a single step indexing of the turret table.

The movement of relay R closes the normally open bridges R–3, R–4, so that current now flows from conductor 102 by conductor 119, bridge R–4, conductor 120, to the several solenoids 100, and by the conductors 121 to the several switches ES–1, ES–2, ES–3, ES–4. Of these, only the program cam PC–1 has an elevation or lobe acting to close its switch ES–1, while switches ES–2, ES–3, ES–4 remain open as the corresponding cams have depressions or sinks at this position. The conventionalized operation for twelve turret positions is shown in Fig. 19. Hence current only flows through switch ES–1 to conductor 122, bridge R–3, and by conductor 113 back to mains conductor 103: and correspondingly only the solenoid 100 of work unit W–1 is energized and effects an unlatching of work unit W–1, which begins to operate. As the quill or other working part of work unit W–1 moves from its position of rest, the corresponding switch 101 of this work unit W–1 is opened, thereby interrupting any flow of current through conductors 104, 105. At this time, bridge R–1 is open but bridge R–2 is closed: the interruption at any switch 101 causes cessation of current through conductors 105, 116, bridge R–2 and conductor 115, switch ES–7, conductor 114, and conductor 111, so that the coil of relay R is now deenergized. Relay R opens again, thus deenergizing the circuits leading to the solenoids 100 and to switch ES–7; and closing bridge R–1 to conductor 106, but no current can flow due to the open position of the switch 101 of work unit W–1. This condition prevails so long as the work unit W–1 is operating and until it has completed its stroke and returned to its rest position, at which it is stopped by the effect of the latch released when its solenoid 100 was deenergized, after closing its supervisory switch 101 again.

As soon as the switch 101 has closed, current can again flow through conductors 104, 105 and bridge R–1 to conductor 106, conductor 125, selector switch SS, conductor 126, switch ES–8, conductors 127, 107, for energizing the coil of relay N so that a new operation of solenoid 65 is procured, with a further indexing movement from turret position 1 to position 2. During this indexing movement, the program structure and the turret are moved as before, with a momentary closure of switch S by cam HT as the turret indexing unit attains the end of its movement and comes under control of its latch as the solenoid 65 is again deenergized, wherewith the above sub-cycle of indexing operation has been repeated. The work unit W–1 again acts, to spot-drill a second hole; but units W–2, W–3, W–4 remain idle as their cams PC–2, PC–3, PC–4 have not closed the associated circuits (noting the cam lobes in Fig. 19). At completion of this second operation at position 2 by work unit W–1, its switch 101 is closed, and the third sub-cycle is initiated with an indexing movement to position 3: after which work unit W-1 acts to spot the third hole. Also program cam PC-2 now has advanced by two spaces and presents an elevation or lobe which closes its switch ES-2, so that when current flows to conductor 120, solenoids 100 of work units W-1 and W-2 are both energized, wherewith work units W-1 and W-2 are both caused to operate after this second completed indexing step, with unit W-2 acting to drill the first hole which has been spotted by unit W-1. Both work units W-1 and W-2 perform their work and individually return to their initial disengaged positions and thereupon close their respective switches 101: so that current can again flow through conductors 104, 105 and as before procure closure of relay N with energization of solenoid 65, for initiating the fourth indexing sub-cycle of movement. When this fourth indexing has been performed from turret position 3 to position 4, units W-1 and W-2 again perform while units W-3 and W-4 remain idle, so that unit W-1 spots the fourth hole and unit W-2 drills the second spotted hole. As the units W-1 and W-2 return again, their switches 101 are closed; and the fifth sub-cycle begins with indexing to turret position 5, followed by a further action of work units W-1 and W-2. Also program cam PC-3 has now been moved so that its switch ES-3 has closed, and work unit W-3 now acts to ream the first hole, which has been spot-drilled by unit W-1 and drilled by unit W-2. Now upon return of all three units W-1, W-2, W-3, their switches 101 are closed and initiate the sixth sub-cycle of indexing to position 6 followed by action of units W-1, W-2, W-3. Upon return of these units W-1, W-2, W-3, the switches 101 are closed for initiating the seventh sub-cycle with indexing to position 7 followed by action of units W-1, W-2, W-3. Also program cam PC-4 has now closed its switch ES-4 so that unit W-4 begins action, and counterbores the first hole which has been spot-drilled, drilled and reamed successively at units W-1, W-2, W-3 as such hole location on the work blank WB has been indexed to and past the several units. These sub-cycles can be continued for any number of turret positions and work units desired. In the illustrative case, four work units are shown, and the successive indexing sub-cycles following the entry of work unit W-4 into operation will have all four work units concurrently acting and returning: and these operations can be performed for any number of turret positions.

In the illustrative example of spot-drilling, drilling, reaming and counterboring operations for the respective units W-1, W-2, W-3, and W-4, the spot-drilling operations will be completed before the drilling, reaming and counterboring operations are completed. Thus the spot-drilling is completed at the first rotation of the turret TT, but the other operations are not. For this situation, the program cam PC-1 acts to again open its switch ES-1 after the last drilling operation demanded by the schedule. The work unit W-1 must act twelve times for Fig. 1, and the dotted lines on work piece WB show that this piece has just been indexed to bring its last hole location opposite the unit W-1 completing 360 degrees of turret movement. Thus, when current again flows to conductor 120 in a sub-cycle, the unit W-1 performs its last operation: when the next indexing occurs, to program position 13, and with the turret starting a second rotation, the solenoid 100 of work unit W-1 is not energized, and this unit remains idler. Thereafter, in succession, the work units W-2, W-3 and W-4 are held out of operation by the actions of their program cams PC-2, PC-3, PC-4. Each cam PC-1, PC-2, PC-3, PC-4 has an elevation or lobe extending for half its periphery in this form of practice, so that the corresponding switch is closed and held closed for twelve indexing movements, and then opened and held open for the next twelve indexing movements: the cams are so located in the program cam nest, with regard to the positions of the switches controlled thereby (Fig. 8) that cam PC-1 first closes at the first indexing and opens at the thirteenth; cam PC-2 first closes at the third indexing and opens at the fifteenth; cam PC-3 first closes at the fifth indexing and opens at the seventeenth; and cam PC-4 first closes at the seventh indexing and opens at the nineteeth. The nineteenth to twenty-fourth indexing movements are performed without any action by the work units W-1, W-2, W-3, W-4, and complete the second rotation or a total of 720 degrees of the work piece WB as a full automatic cycle of machine operation.

It will be noted that, dependent upon the number of lugs 20, 21 and the spacing of the work units about the machine axis, any desired number of spot-drilling operations may be performed by unit W-1, with indexing following each operation, before the work is advanced to position for drilling by work unit W-2, etc., by displacing the lobe of cam PC-2 by the angle representing the number of indexing movements, shown illustratively in Figs. 1 and 19 for two such movements; and in Fig. 20 for five such movements: i. e. unit W-2 is idle at turret positions 1, 2, 3, 4, and 5; and that similarly multiple index sub-cycles can be provided before units W-3, etc., come into action after unit W-2 begins.

Similarly, a unit can be held out of action after any given indexing movement, by providing its cam with a depression or sink for opening the corresponding switch at such point. In Fig. 21, a drilling unit W-1 controlled by cam PC-1 is to act at turret positions 1 and 7 but not at other positions; the reaming unit W-3 is to act at positions 5 and 11 after the drilling by unit W-1 (noting that each drilled hole must move by four indexing sub-cycles before it is reamed); and a drilling unit W-4 is to form drilled holes (of a different size, for example) at stations 4 and 10. Thus the cam PC-1 has lobes at positions 1 and 9: cam PC-2 has lobes at positions 5 and 11; and cam PC-4 has lobes at positions 4 and 10.

Further, each program cam PC-1, PC-2, PC-3 . . . may control more than one work unit. In Fig. 22, the program cam PC-1 actuates switch ES-1 as before, but two work units W-1 and W-1a are controlled thereby, through their individual solenoids 100 which are connected between conductor 120 and conductor 121 leading to switch ES-1. With this arrangement, the units W-1 and W-1a start together and individually return to finally close their corresponding switches 101. The units W-1 and W-1a need not be located opposite the same turret station, noting that when the turret has made a full rotation, each unit has acted at each turret position in the form of setup in Fig. 22, and the work is completed so far as they are concerned.

In each of the forms, when the alternating sub-cycles of indexing and work unit operation have completed a full rotation of the turret, the work unit W-1 has performed all its necessary operations upon the work, but the reaming and counterboring operations have not been finished. In the simplified diagrams of Figs. 19, 20, 21 and 22, the turret performs twelve indexing movements, to stations 0 to 12 inclusive, and is then back in initial position. The 2:1 reduction between the index drive and the program structure, however, causes the program cams to turn through only a half-rotation, from positions 0 to 12 as noted at the peripheries. The program cam PC-1 (Fig. 19) has a sink from position 12 through positions 13, 14, etc., back to position 0, so that its switch EC-1 is not closed at the corresponding positions, which represent a second rotation of the turret and its work. Program cam PC-2 has its lobe continued to position 14 so that the work unit W-2 performs a final operation at the spot drilled by unit W-1 at position 12, and has a sink extending from position 14 to position 3 so that it only comes into action when position 3 is reached again. Correspondingly program cam PC-3 acts at position 16, but thereafter holds its switch open until position 5, and cam PC-4 acts at position 18, and then holds its switch ES-4 open until position 7. Operation controlling program cam PC-8, however, has only a short sink, at position 0, and its lobe operates to hold switch ES-8 closed except at this position, therefore the indexing sub-cycles continue from program position 0 for a full rotation to position 0 again, and then terminate when switch ES-8 opens to prevent further energizing of relay N.

The non-work-operation sub-cycles, that is, the movements through a position at which no work is to be done by any work unit, is shortened by the action of program cam PC-7 which controls the maintaining circuit for relay R. During the indexings from working position to working position, the switch S is actuated by cam HT to effect current flow for energizing relay R and provoking energization of one or more solenoids 100, this flow ceasing shortly thereafter as the index cam HT attains the end of the sub-cycle, and the movement of relay R opens the circuit through its bridge R-1 so the relay N opens, releasing the index latch controlled by solenoid 65. This movement of the relays is necessary if no work is to be performed at the position. Hence the program cam PC-7 has a profile with a depression at each position where no work is to be done, thus in Fig. 19 this cam PC-7 has a sink extending from positions 19 to 0. In operation, as the unit W-4 completes its action at position 18 and its switch 101 initiates a new sub-cycle of indexing by energizing the coil of relay N and therethrough the solenoid 65, the program cam PC-7 presents a depression to the switch ES-7 as position 19 is approached in indexing, and when the index cam HT closes switch S, current flows from conductor 102, through conductor 110, switch S, conductor 111, the coil of relay R, back by conductors 112, 113 to main conductor 103. No current flows through switch ES-7 because it is open and thus no maintaining circuit is present for relay R.

In moving, relay R opens its bridge R-1 and closes bridges R-2, R-3 and R-4. This movement of relay R closes the normally open bridge R-3, R-4, but no current flows because program switches ES-1, ES-2, ES-3 and ES-4 are open and no unlatching of the work units can take place. Since relay R now has no maintaining circuit it immediately drops out and current through its bridge R-1 pulls in relay N again, thus causing another indexing of the turret. This pulling in of relay R by switch S and the operation of relay N, and in turn of the trip solenoid 65, can continue for as many idle indexings as necessary and until the program structure presents a rise on the program cam PC-7 to close switch ES-7, and also presents a cam PC-1 . . . PC-4 for closing the corresponding switch ES-1 . . . ES-4 for tripping the proper work unit. If the idle indexings come at the end of the complete program, then switch ES-8 is opened at the home position and no further idle indexings can take place.

It will be noted that the cam PC-7 of Fig. 19 can be used with the cams in Figs. 20 and 22.

In Fig. 23 is shown a cam PC-7, for producing a like effect with the setup of Fig. 21. Since work operations are to be performed at positions 1, 4, 5, 7, 10 and 11, the cam in Fig. 23 has elevations at these positions and depressions elsewhere. In action, the sub-cycle to position 1 results in operation of work unit W-1; thereafter in sub-cycles 2 and 3, the relay R is not energized and indexing starts without tool movement; at position 4 a movement of W-4 occurs; at position 5 a movement of W-3; at position 6 merely indexing occurs; at position 7 W-1 moves; at positions 8 and 9 there is indexing only; at position 10 W-4 moves; at position 11 W-3 moves; and finally there is a succession of mere indexing movements from position 12 around to position 0.

When semi-automatic operation is desired, for example while the first couple blanks are being worked, the selector switch is left open. The other parts are in the same condition as during fully automatic operation.

Momentary closing of the hand switch HS now effects energization of the relay N and solenoid 65 so that the index drive starts. Opening of the hand switch HS deenergizes the relay N and solenoid 65 so that the latch is ready to stop the index drive after one sub-cycle of its movement. When the index drive has moved the turret to its position 1, switch S is closed momentarily as before; the relay R is energized and its coil maintained energized through bridge R-2 and switch ES-7, noting that if no work is to be done at position 1 the shape of cam PC-7 can be such that the switch ES-7 is left open so that relay R does not move. When work is done at position 1, the closures at relay R cause the solenoids 100, as selected by the corresponding program cams PC-1, PC-2, PC-3, etc., to act and start the corresponding work units W-1, W-2, W-3, etc. As each unit completes its work and returns to initial position, at which it is re-latched because its solenoid 100 has become deenergized, its switch 101 is closed. When all switches 101 have closed, the circuit through conductors 104, 105, 106, 107 is still open at the switches HS and SS; and relay N does not close to start a new sub-cycle. Upon momentary pressing of HS, a new sub-cycle starts, with turret and program movement from position 1 to position 2: a selection of the work to be done at position 2 is accomplished by program cams PC-1, PC-2, PC-3, etc.: or the position is passed idly by action of a depression in cam PC-7 at this position: and the machine comes to rest again. Successive momentary closures of the hand switch HS produce the successive sub-cycles of indexing movement and work unit movement (or idling). With the illustrated form, when the turret has thus been actuated by successive indexing sub-cycles until it has completed two rotations, it is back to initial position and all work has been performed at each selected location thereon.

I claim:

1. In a machine of the class described, a base, a turret rotatable on the base; indexing means for advancing the turret from station to station and including a device which is continued in movement for a time after the turret movement has ceased for the prevailing cycle and including a first electromagnetic device effective upon energization for procuring an indexing cycle and a first switch open during the indexing movement of the turret in the prevailing cycle and momentarily closed upon completion of the cyclic movement of the turret and reopened prior to cessation of movement of the said device; work units each having means for feeding and retracting a work unit tool relative to the turret, each work unit having a second electromagnetic device effective upon energization for procuring a feeding and retraction cycle and a second switch which is open during the feeding and retraction cycle and is closed at the completion of the cycle; a program system actuated concurrently with movement of the turret including a plurality of cams and third switches individually controlled by the cams; first circuit means including in series the said second switches and connected to the first electromagnetic device for energizing the same, and second circuit means including said first switch and having branches each including a third switch and a second electromagnetic device for procuring the energization thereof; whereby the cams are effective to select the work units to be energized after each indexing cycle.

2. In a machine as in claim 1, the combination therewith of a master switch and a cam in the program system for controlling the same, said master switch being connected in series in said first circuit means, the master switch cam procuring opening of the master switch in a predetermined position of the turret, and a normally open starting switch connected in shunt to the master switch.

3. In a machine as in claim 1, the combination therewith of an operation-completing switch and a cam in the program system for controlling the same, the operation-completing switch being connected to said first electro-magnetic device and actuated by its said cam in a predetermined position of the turret for procuring an indexing movement independently of a prior cycle of movement of any work unit.

4. In a machine as in claim 1, in which the cams for the third switches are shaped to retain the associated switches open in a predetermined position of the turret, the combination therewith of an operation-completing switch and a cam in the program system for controlling the same, the operation-completing switch being included in said first circuit means, the shape of said operation-completing switch cam being effective to close its associated switch in said predetermined position of the turret.

5. In a machine as in claim 1, the combination therewith of a master switch and a selector switch in series in said first circuit means, a cam in the program system for controlling the master switch and effective for opening the same in a predetermined turret position, and a normally open starting switch connected in shunt to the master and selector switches.

6. In a machine of the class described, a base, a turret rotatable on the base; cyclic indexing means for advancing the turret and including a first electromagnetic device effective upon energization for procuring an indexing cycle and a first switch closed upon completion of an indexing cycle; work units each having means for feeding and retracting a work unit tool relative to the turret, each work unit having a second electromagnetic device effective upon energization for procuring a feeding and retraction cycle and a second switch which is closed upon completion of a feeding and retraction cycle; and a program system actuated in unison with movement of the turret including a plurality of rotary cams and third switches individually controlled by the cams, said cams being moved a complete revolution during a multiple number of turret revolutions a relay having a coil and normally open and normally closed contacts; first circuit means including in series the said second switches and a set of said normally closed contacts and connected for energizing said first electromagnetic device; second circuit means including said relay coil and said first switch; and third circuit means including a set of said normally open contacts and having branches each including a third switch and a said second electromagnetic means.

7. In a machine as in claim 6, the combination therewith of an operation-completing switch connected to the part of the first circuit in series with the second switches and connected in series with a set of said normally open contacts and connected to said second circuit between the relay coil and first switch; and a cam in the program system for actuating the operation-completing switch.

8. In a machine as in claim 6, the combination therewith of a master switch connected in series in said first circuit means, and a cam in the program system for holding said master switch closed in certain predetermined positions of the turret and for procuring opening of the master switch in another position of the turret.

9. In a machine of the class described and comprising a base, a turret rotatable on the base, cyclic indexing means for advancing the turret and including an index-movement initiating means for procuring an indexing cycle, work units on the base and each including means for feeding a work unit tool relative to the turret, first circuit means including first electrical switches in each work unit for controlling said initiating means and causing an indexing cycle to begin when all the work units are in tool-withdrawn position, and second circuit means including a second electrical switch controlled by the turret for energizing said feeding means when the turret has completed an indexing movement; the combination therewith of a rotatable member, means connecting the turret and rotatable member so that they move concurrently, a plurality of individual program elements connected for rotation with said rotatable member, third electrical switches operated by individuals of said program elements, said second circuit means having branches for the individual work units and each of said branches having therein one of said third switches, a fourth switch for momentarily closing said first circuit means, and a fifth electrical switch operated by one of said program elements and connected in said first circuit means for maintaining energization therein after the momentary action of said fourth switch and during the course of a cycle of the rotatable member.

10. In a machine as in claim 9, the combination therewith of electrical switch means controlled by one of said program elements and included in said first circuit means and cooperative with said first electrical switches for procuring initiation of an indexing cycle at a predetermined turret position independently of prior cycling of any work unit.

11. In a machine as in claim 9, in which the work units are tooled for performing a schedule of successive operations in a defined order at each of several parts of the work, the combination wherein the said second circuit means includes parts for preventing actuation of a work unit for a later operation until the work unit for the prior operation has acted at the part of the work and said part of the work has been indexed to position opposite said work unit for the later operation, and means effective upon completion of all operations of the work units upon the work for procuring additional indexing movements of the turret independently of actuation of work units whereby to return the turret to its initial position.

12. In a machine of the class described and comprising a base, a turret rotatable on the base, cyclic indexing means for advancing the turret and including an index-movement initiating means for procuring an indexing cycle and a first control element energized by the indexing means upon completion of each indexing cycle, work units on the base and each including means for feeding and retracting a work unit tool relative to the turret, a second control element in each work unit effective upon said feeding and retracting means for initiating a cycle of feeding and retraction of the said tool of the unit, a third control element in each work unit energized by the work unit at the close of the feeding and retraction cycle thereof, first means connecting said third control elements with the said initiating means whereby an indexing cycle is procured when all the third control elements are energized, and second means connecting the first control element to the second control elements whereby feeding and retraction cycles of the work units are procured when the indexing means has completed a cycle: the combination therewith which comprises a rotatable member, a plurality of individual program elements carried in rotation with said member, driving means connecting said turret and rotatable member whereby the rotatable member performs one revolution during two revolutions of the turret, and devices selectively actuated individually by said program elements, each said second connecting means including one of said devices effective for determining whether the associated work unit shall have a feeding and retraction cycle at the turret position attained at the close of the next preceding indexing cycle.

References Cited in the file of this patent
UNITED STATES PATENTS

| | | |
|---|---|---|
| 1,975,006 | Kingsbury | Sept. 25, 1934 |
| 2,013,420 | Opel | Sept. 3, 1935 |
| 2,021,030 | Swahnberg | Nov. 12, 1935 |
| 2,053,400 | Kingsbury | Sept. 8, 1936 |
| 2,429,938 | Mansfield | Oct. 28, 1947 |
| 2,475,501 | Hobby | July 5, 1949 |
| 2,628,413 | Hallenbeck | Feb. 17, 1953 |
| 2,779,220 | Dunn | Jan. 29, 1957 |